May 28, 1935.  A. W. ASMAN  2,003,101
FLOWER HOLDER
Filed June 3, 1933  2 Sheets-Sheet 1
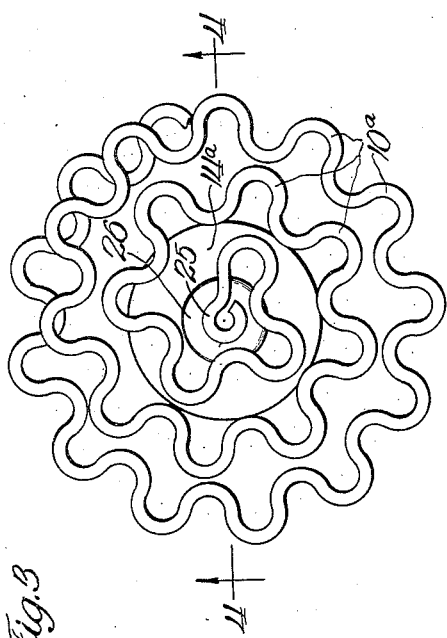
Fig.3
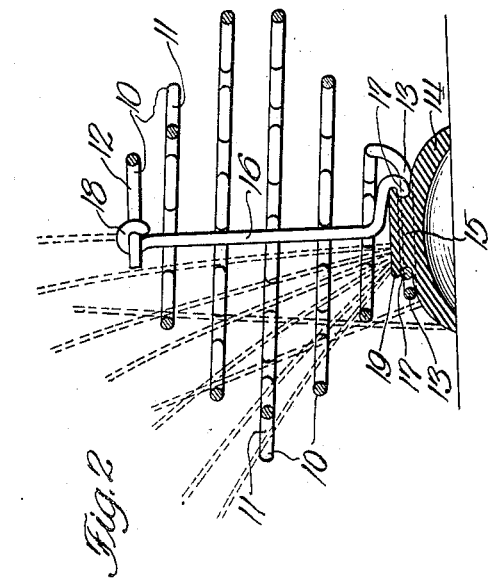
Fig.4
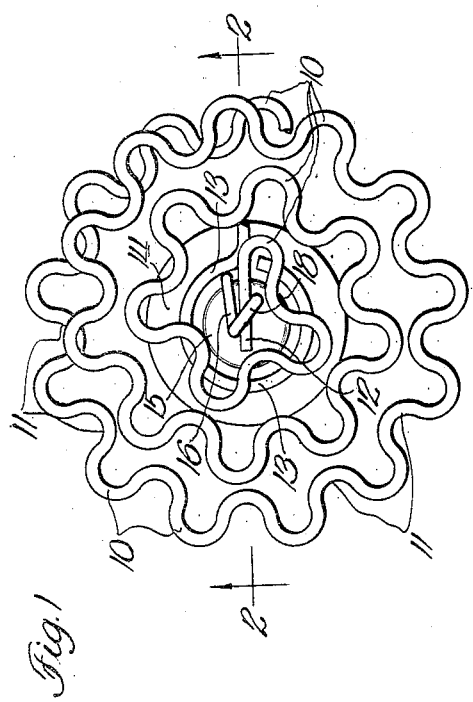
Fig.1
Fig.2
Inventor:
Arthur W. Asman
By Wilbur A. E. Mitchell
atty.

May 28, 1935.  A. W. ASMAN  2,003,101
FLOWER HOLDER
Filed June 3, 1933    2 Sheets-Sheet 2
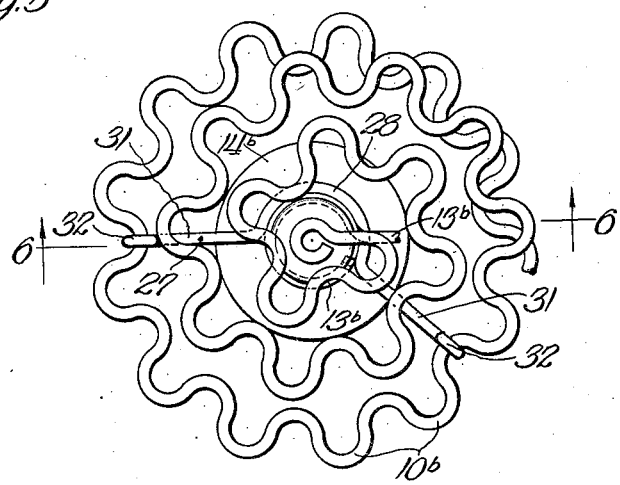
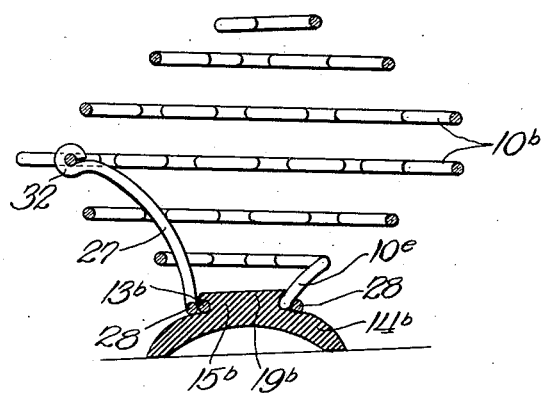
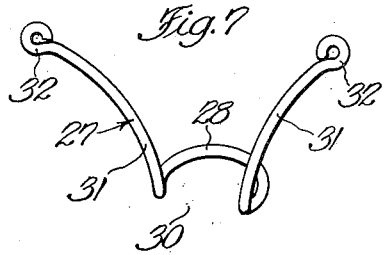
Inventor:
Arthur W. Asman
By Wilbur A. T. Mitchell
Atty Patented May 28, 1935

2,003,101

UNITED STATES PATENT OFFICE 2,003,101

FLOWER HOLDER

Arthur W. Asman, Lombard, Ill.

Application June 3, 1933, Serial No. 674,175

13 Claims. (Cl. 47—41)

This invention relates to improvements in flower holders, and more particularly to a flower holder for holding either fresh cut or artificial flowers in suitable and attractive arrangement in any desired size bouquet, either in a receptacle containing water or in a receptacle without water or on any suitable surface. Still more particularly my invention refers to a flower holder comprising a serpentine wire formed in a double spiral, which is substantially an ellipsoid of revolution, having vacuum means connected therewith to detachably secure the same where desired.

Among other objects, the present invention is primarily intended to provide a practical flower holder of simple construction having means for detachably securing the same where desired, and which can be manufactured at a small cost.

More specifically, another object of my invention is to provide means for holding the flower holder substantially upright and which also securely but detachably anchors the same in a desired position, either in a dry receptacle or in a receptacle containing water or on any suitable surface.

A still further object of my invention is to improve devices of the character described in sundry details hereinafter referred to and more particularly defined and pointed out in the appended claims.

With the above and further objects in view, it is to be understood that variations and changes may be made in the several forms of my invention shown herewith without going outside of the scope of the appended claims.

Several forms which the present invention may assume are shown for illustrative purposes in the accompanying drawings in which:

Figure 1 is a plan or view looking downward upon the top of a flower holder, partly broken away, and constructed in accordance with the present invention.

Figure 2 is a transverse sectional view of the modification illustrated by Figure 1 and taken as indicated on the line 2—2 of Figure 1.

Figure 3 is a plan or view partly broken away, looking downward upon the top of another form which the present invention may assume.

Figure 4 is a transverse sectional view of the modification illustrated by Figure 3 and taken as indicated on the line 4—4 of Figure 3.

Figure 5 is a plan or view, partly broken away, looking downward upon another form which my invention may assume.

Figure 6 is a transverse sectional view of the modification illustrated by Figure 5, taken as indicated on the line 6—6 of Figure 5.

Figure 7 is a perspective view of the brace member 27 used in the embodiment of my invention shown in Figures 5 and 6.

Referring now more particularly to Figure 1 and 2 of the accompanying drawings, the present invention comprises a single strand of wire 10 bent into serpentine configuration, having indentations 11 and formed into a double spiral 10 substantial elipsoid of revolution or spheroid. The top end of the upper spiral is straight adjacent its end 12. The lower spiral ends in a circle 13. Positioned inside of the circle 13 is a vacuum cup 14 having a neck 15 around which neck, and below the rib 19 thereof, is securely clamped the lower end 17 of another wire or central stem 16. The upper end of the central stem 16 is shaped into a loop 18, which loop is extended around the straight portion 12 of the upper spiral and of such size as to permit a sliding movement between the two. It will thus be seen that the vacuum cup 14 and the stem 16 securely clamped thereon together constitute a semi-rigid unit which unit, in combination with the double spiral 10 through the connection 18—12 acts as a means for supporting the double spiral 10. In construction the double spiral 10 is preferably formed of such longitudinal length, before the loop 18 of the central stem 16 is placed on the straight portion 12, that the longitudinal length of the double spiral 10 is longer than the member 16, with the result that before the double spiral 10 can be placed up on the unit 14—16 said double spiral must first be contracted down to the length of the stem 16. It is thus apparent that there is a constant outward pressure exerted by the double spiral, longitudinally thereof, at the one end thereof by element 12 pressing against 18, and at the other end thereof by the circle 13 pressing against the vacuum cup 14. As a result of this structure, the entire flower holder has sufficient rigidity and strength to hold the stems of flowers where desired.

This combination presents a flower holder which is semi-rigid in all directions but which has many advantages. For instance, different length stems 16 can be supplied in the event that it is desired to increase or decrease the over-all longitudinal length or height of the flower holder for exceptionally long or short-stemmed flowers. The stem 16 in use can be removed by sliding the loop 18 off the portion 12 and another stem of different length placed thereon after the spiral has been bent longitudinally thereof to meet the new proportionate and desired length. The loose connection between elements 12 and 18 permits removal of the one from the other in the event that such a change of stems is necessary. Stems similar to 16 but of different lengths can be provided either with a vacuum cup already clamped thereon or the old stem can be removed from the vacuum cup 14 in use and the new stem clamped thereon.

In operation the vacuum cup 14 is adapted to be secured to a surface, preferably by first wetting the surface with water or other liquid and then pressing the cup downwardly, by pressure applied through the member 16, until the air or liquid beneath the vacuum cup is expelled, thereby creating a vacuum which holds the cup and entire flower holder in place. It has been found that the device of my invention can be used in any receptacle large enough to receive it, which may or may not contain water. Where water is used in the receptacle, the same will help to prevent breaking of the vacuum under the cup 14. It is to be noted however that the device of my invention can be used on any surface desired, such as on a cabinet in a window display, or on a window-sill, or on any other desired surface by first moistening the surface with a suitable liquid. When used on a flat surface and not in a receptacle, the holder should be covered with some material such as moss, crepe paper or ribbon so as to be hidden from view and not to detract from the appearance of the flowers therein.

In the use of my invention, the stems of the flowers to be held are inserted downwardly between indentations 11 on the inside of the periphery of the upper spiral, of the double spiral 10, and are then extended further downwardly through the lower spiral, of the double spiral 10, either on the inner periphery of the lower spiral 10 or on the outside thereof at indentations 11 depending upon the diametrical size of the bouquet desired. Thus it is to be noted that my invention provides a means to hold any size bouquet in arrangement, and further, to hold the flowers either closely together in a small diameter bouquet, if desired, or to hold them loosely in a large diameter bouquet, as is illustrated by the dotted lines in Figure 2, dependent upon the arrangement of the stems with relation to the double spiral, as previously explained.

It is to be noted further, that my flower holder may be used on an inclined surface such as the side of the inside of a bowl-shaped receptacle, or any inclined surface such as on the slanting portion of a church altar. More than one of my flower holders can be used to hold a large bunch of flowers, if desired, by placing one holder immediately along side of another.

Figures 3 and 4 illustrate a flower holder similar to that shown in Figures 1 and 2 except that there is no support member between the double spiral 10a and the vacuum 14a, the serpentine double spiral 10a being directly and securely fastened to the cup by clamping the circle portion 13a at the bottom of lower spiral, around the neck 15a of the cup thereof, below the rib 19a on the neck of said cup. The upper end of the spiral may be of any configuration, but preferably as shown, is formed in a loop 25 to receive one or more stems of flowers. By this structure, the double spiral holder is held upright by the vacuum cup and, as a result of being securely fastened thereto at the neck 15a, is directly supported thereby. This structure provides a simple and practical flower holder which is sufficiently rigid to hold flowers, and which can be easily adjusted to any desired height to accommodate extremely short or long stemmed flowers by bending the double spiral 10a longitudinally thereof to the desired size. This modification of my invention is of simple construction and can be easily manufactured at little cost and has been found practical in operation. To secure the vacuum cup 14a to a wet surface, pressure is applied to said cup on the upper surface 26 thereof by inserting a finger or small instrument through a side of the double spiral. Otherwise than as explained, the uses and advantages of this modification of my invention are the same as the modification disclosed by Figures 1 and 2.

Figures 5 and 6 illustrate another form of my invention and which is similar to that shown in Figures 1 and 2, except that there is no central vertical stem support between the double spiral 10b and the vacuum cup 14b. The double spiral 10b is securely fastened to the vacuum cup 14b by clamping the circle portion 13b thereof, at the bottom of the lower spiral, around the neck 15b of the cup 14b below the rib 19b, exactly as is shown in Figures 3 and 4. This modification of my invention, shown by Figures 5 and 6, is made by taking the modification thereof shown in Figures 3 and 4 and to it adding the support wishbone or brace member 27, a perspective of which is illustrated by Figure 7. The collar 28, of the wishbone 27, is placed around the outside of the circle portion 13b of the lower spiral after said portion 13b has been securely clamped in place to the neck 15b. The collar 28 is then securely clamped to the vacuum cup 14b around the neck thereof and on the outside of the circle portion 13b of the double spiral. The downwardly extending portion 10e of the lower double spiral, acts to hold the collar 28 in place around the neck 15b outside of the circle clamp 13b and prevents the collar 28 from slipping upwardly off of the neck 15b. The circle portion 28 is preferably greater than 180° so that when clamped in place around the neck 15b outside of 13b it will not come off the neck through the open end 30 thereof. Arms 31 of the wishbone or brace 27 extend upwardly inside of the lower spiral and preferably converge inside outwardly from the perpendicular, as illustrated. The upper end of each arm at 32 is bent around and securely clamped to an indentation of the double spiral on the periphery and substantially centrally longitudinally thereof, as illustrated, such that when secured in place the portion 32 of one arm is substantially opposite the other and corresponding portion 32 of the other arm. It is apparent that the brace member 27, when attached as shown, acts as a means for supporting the flower holder. This structure presents a flower holder of greater rigidity than the other modifications of my invention, of sufficient strength to hold larger flowers and very bulky bouquets when necessary, and is practical to hold other things than flowers for display purposes, being made into any desired size. Other than as explained, this modification has the same uses and advantages as disclosed previously herein appurtenant to my other modifications.

Throughout my invention, the wire used in the construction of the double spiral is preferably galvanized so that it will not rust when used in water, and is preferably of such size and strength that it will inherently hold ordinary flowers without bending. However, when a sufficient and greater amount of force is applied thereto the spiral can be bent so as to increase or decrease the over-all longitudinal length thereof, for reasons previously described.

While I have thus disclosed and described several preferred embodiments of my invention, it is apparent that many variations and changes may be made therein without varying from or distinguishing over the spirit and scope of my invention. Moreover, all of the features of my invention need not be used conjointly, as the same may be used to advantage in variously different combinations and sub-combinations. I therefore wish to be limited only by the appended claims.

Having thus described my invention what I claim as new and desire to cover by Letters Patent is:—

1. In an article of the class described, the combination of a serpentine holding means, and vacuum means for holding said serpentine means.

2. In an article of the class described the combination of a serpentine member adapted to receive and support flower stems, and a vacuum means connected therewith for detachably securing said member to any desired surface.

3. In an article of the class described, the combination of serpentine spiral means, substantially an ellipsoid of revolution, and means for detachably securing said spiral means to any desired surface.

4. In an article of the class described, the combination of serpentine means, vacuum means, and means connecting the two.

5. In an article of the class described, the combination of a single spiral ellipsoid of revolution serpentine wire adapted to receive and support flower stems, means connected therewith for detachably securing said first means to any desired surface, and means connecting the two for supporting the first means upon the second means.

6. A flower holder comprising a single spiral serpentine wire, and vacuum means connected therewith for supporting and detachably securing said wire to any desired surface.

7. In an article of the class described, a wire bent into serpentine spiral configuration adapted to receive flower stems and of sufficient strength to support said stems, and vacuum means carried by said wire for supporting the wire in operative position to receive flower stems and adapted to be detachably secured to a desired surface.

8. In an article of the class described, a wire bent into serpentine double spiral configuration, substantially an ellipsoid of revolution, adapted to receive flower stems, said wire having sufficient strength to support said stems, and a vacuum cup connected with said wire for supporting the wire in operative position to receive stems and adapted to be detachably secured on any surface.

9. In an article of the class described, a wire bent into serpentine double spiral configuration, substantially an ellipsoid of revolution, said wire being adapted to receive flower stems and of sufficient strength to support said stems, and a vacuum cup securely fastened directly to said wire for supporting the wire in operative position to be detachably secured on any desired surface, and said wire being adapted to be bent longitudinally of the double spiral to change the size of the latter upon the application of greater pressure than exerted by a bouquet of flowers.

10. An article of the class described comprising a wire bent into sepentine double spiral configuration, substantially an ellipsoid of revolution, adapted to receive flower stems, said wire being of sufficient strength to hold said flower stems in any desired bouquet formation, a vacuum cup detachably secured directly to said wire for supporting the wire in operative position to hold flowers and being adapted to be detachably secured to any desired surface, and means secured to said cup and extending upwardly inside of said double spiral and secured thereto at substantially opposite sides of the periphery thereof for bracing said double spiral on said cup.

11. A flower holder comprising a single wire bent into serpentine and double spiral configuration, said wire being of sufficient strength to support flower stems thereon, whereby the stems of flowers may be inserted into said double spiral and held thereby in any desired diametrical sized bouquet, and vacuum means connected with said wire for supporting the same in position to receive and support flowers and being adapted to be detachably secured to any desired surface.

12. In an article of the class described, a wire bent into serpentine double spiral configuration, substantially an ellipsoid of revolution, adapted to receive flower stems, said wire having sufficient strength to support said stems, a vacuum cup connected with said wire for supporting the wire in operative position to receive stems and adapted to be detachably secured on any surface, and means for bracing said double spiral.

13. In an article of the class described, a wire bent into serpentine double spiral configuration, substantially an ellipsoid of revolution, adapted to receive flower stems, said wire having sufficient strength to support said stems, a vacuum cup connected with said wire for supporting the wire in operative position to receive stems and adapted to be detachably secured on any surface, and means inside said spiral for bracing said double spiral.

ARTHUR W. ASMAN.